July 23, 1940.  H. A. FLOGAUS  2,208,669
VEHICLE HEATER
Filed Oct. 28, 1937
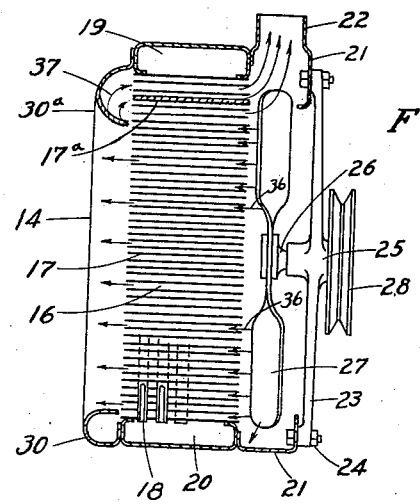
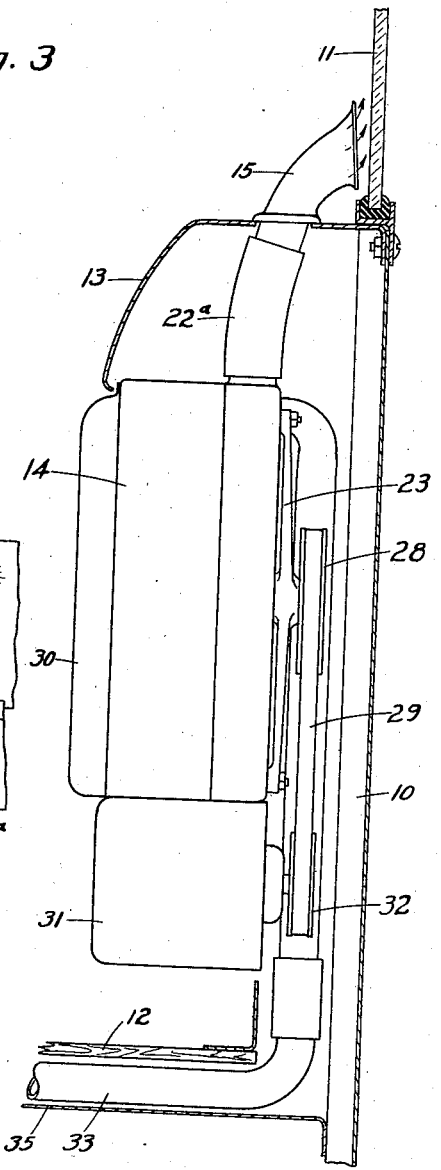
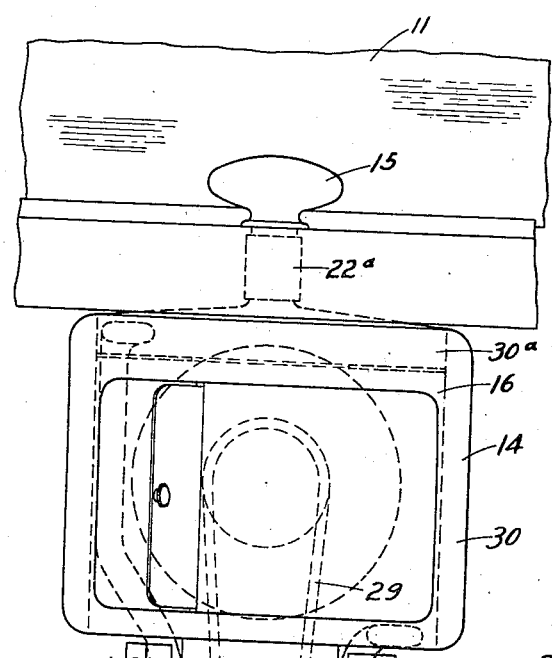
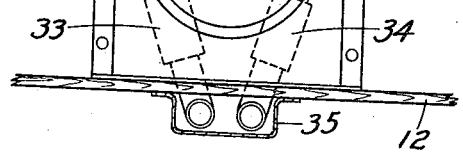
INVENTOR.
Howard A. Flogaus
BY
ATTORNEY.

Patented July 23, 1940

2,208,669

UNITED STATES PATENT OFFICE 2,208,669

VEHICLE HEATER

Howard A. Flegaus, Lansing, Mich., assignor, by mesne assignments, to Reo Motors, Inc., Lansing, Mich., a corporation of Michigan Application October 28, 1937, Serial No. 171,545

3 Claims. (Cl. 257—137)

This invention relates to heaters for the interiors of motor vehicle bodies, and more particularly to heaters of the type which have a connection to a defroster adjacent the windshield for defrosting the same.

An object of the invention is to provide a heater with an opening for attachment to a windshield defrosting device, the heater being so constructed that the air passing to the defroster is heated to a higher temperature than it would be with a heater of conventional design.

Another object of the invention is to provide a heater with an outlet for connection to a windshield defroster, the outlet being so arranged that the tips of the fan blades act as a blower to force air through the outlet.

Other objects of the invention will become apparent from the following specification when read in connection with the accompanying drawing wherein like reference numerals designate corresponding parts in the several views.

In the drawing:

Figure 1 is a front elevational view of a heater embodying my invention in place in a vehicle body;

Figure 2 is a side elevational view of the device shown in Figure 1; and

Figure 3 is a vertical cross-sectional view of the heater shown in Figures 1 and 2.

The drawing illustrates a portion of a vehicle body, which in the present instance is a bus body, comprising a dash 10, a windshield 11 mounted above the dash, and a floor 12. Connected to the dash 10 just below the windshield 11 is an instrument panel 13. Adjacent the center of the windshield 11 an opening is formed in the instrument panel 13 in which is secured a defroster 15 for directing warm air from the heater onto the windshield to defrost the same.

The heater 14 comprises a core 16, which is formed in a conventional manner from a plurality of closely spaced, horizontally disposed parallel metal plates 17 through which extend a plurality of metallic tubes 18. These tubes 18 pass through the plates 17 at right angles thereto and are preferably connected to the plates 17 by soldering. At the top and bottom of the core are headers 19 and 20 respectively which are formed from sheets of metal bent to the cross-section shown in Figure 3, and are secured to the top and bottom plates 17 respectively by sweating them thereto. These headers, it will be understood, are closed at the ends so as to be water-tight.

At the back of the heater is a fan housing 21 which is preferably secured to the back ends of the headers 19 and 20 by welding. Other means of connection may be used, however. The upper end of the housing 21 is formed with a cylindrical tubular flange 22 forming an opening through which the hot air may be delivered to the defroster 15. The tubular flange 22 is connected by hose connection 22a to the defroster 15.

Connected to the back of the fan housing 21 is an open spider 23 which is connected to the housing by means of bolts 24. The spider has a central hub 25 which is provided with a bearing for the reception of a shaft 26 that supports a disk fan 27 at one end. At the other end of the shaft 26 is a pulley 28 which is adapted to be driven by a belt 29.

The outer edges of the front end of the heater are ornamented and concealed by means of a molding 30. This molding extends completely around the core 16 and at the top is considerably wider than it is at the other three sides. The top portion 30a of the molding 30 is substantially semi-circular in cross-section and extends downwardly a substantial distance over the front end of the core 16, and has its lower edge substantially in contact with the front end of said core 16. This upper end 30a of the molding 30 forms a deflector for intercepting a portion of the air passing through the core and directing it back in a reverse direction through the core.

Approximately midway between the top and bottom edges of the deflector 30a is a re-directional baffle 17a. This baffle 17a is similar to the plates 17 but extends outwardly a short distance from both ends of the core 16. The rear end of the baffle 17a is arranged very close to the fan 27 to prevent air from the central portion of the fan from flowing radially thereof.

Secured to the lower header 20 is a motor 31, to the shaft of which is secured a pulley 32. This pulley 32 is connected to the belt 29 to drive the pulley 28 and fan 27. The motor may be operated from the storage battery which furnishes the power for the lights and the ignition of the bus.

A hot water feed pipe 33 is connected at one end to the water jacket of an engine, not shown, and is also connected at its other end to the top header 19. A cold water return pipe 34 is connected at one end to the lower header 20 and to the water jacket of the engine at the other. The hot water feed pipe and the cold water return pipe pass through a duct 35 secured beneath the floor boards 12 of the vehicle and pass to the engine where they are secured to the water jacket.

When the heater herein described is in use, hot water from the engine water jacket passes through the hot water feed pipe 33 to the top header 19 from whence it flows through the vertical tubes 18 to the lower header 20 and back through the cold water return pipe 34 to the engine. The hot water flowing through the core 16 heats the tubes 18, the plates 17 and baffle 17a, so that any air passing through the core absorbs the heat from the core and is thus transmitted to the vehicle body.

The fan 27 forces air through the core and as most of the core is open to the vehicle body, substantially all of the air flows directly into said body as indicated by the arrows 36. A certain portion of the air that flows through the core, however, is intercepted by the deflector 30a, is reversed in direction and forced back through the uppermost portion of the core 16, as indicated by the arrows 37. In this manner, the small amount of air that is intercepted by the deflector 30a is heated to a greater extent than it would be if passed only once through the core. Consequently, the air which passes out of the opening 22 to the defroster 15 operates much more efficiently in defrosting the windshield than it otherwise would.

In addition to absorbing more heat by passing through the core twice, the air is brought back to a point located radially of the fan 27. The fan, therefore, acts as a blower to force the air out of the outlet 22. It is well known that a disk type fan forces air in an axial direction from all but the tips of the blades, but these tips act to push the air radially only. It will be readily apparent therefore that the air intercepted by the deflector 30a is acted upon by the central portions of the blades of the fan 27 to force the air longitudinally through the core below the re-directional baffle 17a, and back through the core above said baffle. In addition, the tips of the blades of the fan 27 force air radially outwardly through opening 22, thereby tending to create a partial vacuum in the core above the baffle 17a and draw the air out of that portion of the core. In this manner a considerable quantity of air may be heated and delivered to the defroster 15.

It will be seen, therefore, that this invention produces a marked improvement over prior heaters in providing means for heating the air used to defrost the windshield to higher temperatures than would normally be had, and also a greater volume of air is drawn through the defroster by means of the radial blower effect of the tips of the blades of the fan.

Though the invention herein described has been shown in a bus body, it will be obvious that it may be used in other types of vehicles, and I desire, therefore, to be limited only by the scope of the appended claims.

I claim:

1. Air heating and circulating apparatus comprising a heat exchanging core having a plurality of longitudinally extending openings therethrough, a disk type fan located at one end of said core and adapted to force a current of air through said openings, a housing enclosing one lateral side of said core and a portion of said fan and having an aperture therein in the plane of the fan, and means at the end of the core opposite the fan for intercepting a portion of the air passing through the core and deflecting it back through the core into a zone where it may be acted upon by the tips of the fan blades and forced out of said aperture.

2. Air heating and circulating apparatus comprising a heat exchanging core having a plurality of longitudinally extending openings therethrough, a disk type fan located at one end of said core and adapted to force a current of air through said openings, a housing enclosing one side of said core and a portion of said fan and having an aperture therein in the plane of the fan, a baffle spaced from the housing and extending longitudinally of the core, and a deflector at the end of the core opposite the fan for intercepting a portion of the air passing through said core, said baffle and deflector forming a reentrant passageway for conveying the portion of the air intercepted by the deflector back through the core into a zone where it may be acted upon by the tips of the fan blades and forced out of said aperture.

3. Air heating and circulating apparatus comprising a heat exchanging core having a plurality of longitudinally extending openings therethrough, a fan located at one end of said core and adapted to force a current of air through said openings, a housing surrounding the sides of the core and a portion of said fan, said housing having an aperture therein in the plane of the fan, a baffle parallel to and spaced from one side of the housing and extending longitudinally through the core, and a deflector attached to the side of the housing adjacent said baffle for intercepting a portion of the air passing through the core and directing it back through the core between the baffle and the adjacent side of the housing into a zone adjacent the aperture in the housing whereby it may be acted upon by the tips of the fan blades and formed out of said aperture.

HOWARD A. FLOGAUS.